US007519629B2

(12) United States Patent
Hafner et al.

(10) Patent No.: US 7,519,629 B2
(45) Date of Patent: Apr. 14, 2009

(54) SYSTEM AND METHOD FOR TOLERATING MULTIPLE STORAGE DEVICE FAILURES IN A STORAGE SYSTEM WITH CONSTRAINED PARITY IN-DEGREE

(75) Inventors: James Lee Hafner, San Jose, CA (US); Jeffrey R. Hartline, Ithaca, NY (US); Tapas Kanungo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 10/956,466

(22) Filed: Sep. 30, 2004

(65) Prior Publication Data

US 2006/0074995 A1    Apr. 6, 2006

(51) Int. Cl.
*G06F 17/00* (2006.01)

(52) U.S. Cl. .................. 707/202; 708/531; 711/114; 714/6; 714/800; 707/203; 707/204

(58) Field of Classification Search .................. None
See application file for complete search history.

(56) References Cited

U.S. PATENT DOCUMENTS

| 5,072,378 | A |   | 12/1991 | Manka ................. 395/575 |
| 5,331,646 | A |   | 7/1994  | Krueger et al. ........ 371/40.1 |
| 5,416,915 | A |   | 5/1995  | Mattson et al. ........ 395/425 |
| 5,497,457 | A | * | 3/1996  | Ford ....................... 714/6 |
| 5,515,502 | A | * | 5/1996  | Wood ..................... 714/15 |
| 5,613,085 | A | * | 3/1997  | Lee et al. ............... 711/114 |
| 5,634,109 | A |   | 5/1997  | Chen et al. ............. 395/470 |
| 5,734,813 | A | * | 3/1998  | Yamamoto et al. ......... 714/6 |
| 5,862,158 | A |   | 1/1999  | Baylor et al. ........... 371/49.1 |
| 5,933,834 | A | * | 8/1999  | Aichelen ............. 707/103 R |
| 6,038,570 | A | * | 3/2000  | Hitz et al. ............. 707/204 |
| 6,052,759 | A | * | 4/2000  | Stallmo et al. ........ 711/114 |
| 6,079,028 | A |   | 6/2000  | Ozden et al. ............ 714/6 |
| 6,327,672 | B1 | * | 12/2001 | Wilner .................... 714/6 |
| 6,332,177 | B1 | * | 12/2001 | Humlicek .............. 711/114 |
| 6,467,023 | B1 | * | 10/2002 | DeKoning et al. ....... 711/114 |
| 6,574,746 | B1 | * | 6/2003  | Wong et al. .............. 714/6 |
| 6,826,711 | B2 | * | 11/2004 | Moulton et al. ........... 714/6 |
| 6,985,995 | B2 | * | 1/2006  | Holland et al. ......... 711/114 |
| 7,000,143 | B2 | * | 2/2006  | Moulton et al. ........... 714/6 |
| 7,076,606 | B2 | * | 7/2006  | Orsley ................. 711/114 |
| 7,103,716 | B1 | * | 9/2006  | Nanda .................. 711/114 |
| 7,353,423 | B2 | * | 4/2008  | Hartline et al. ............ 714/6 |

OTHER PUBLICATIONS

Rockwood, Ben, "RAID Theory: An Overview," The Cuddletech Veritas Volume Manager Series (Apr. 8, 2002).*

* cited by examiner

*Primary Examiner*—Hung Q Pham
*Assistant Examiner*—Hubert Cheung
(74) *Attorney, Agent, or Firm*—Andrew P. Tennent; Jose Gutman; Fleit Gibbons Gutman Bongini & Bianco P.L

(57) ABSTRACT

A fault-tolerant system for storage arrays has constraints on the number of data from which each redundancy value is computed. The fault-tolerant system has embodiments that are supported on small array sizes to arbitrarily large array sizes, and can tolerate a large number T of failures. Certain embodiments can tolerate many instances of more than T failures. The fault-tolerant system has efficient XOR-based encoding, recovery, and updating algorithms and has simple redundancy formulas. The fault-tolerant system has improved IO seek costs for certain multiple-element sequential host updates.

17 Claims, 13 Drawing Sheets

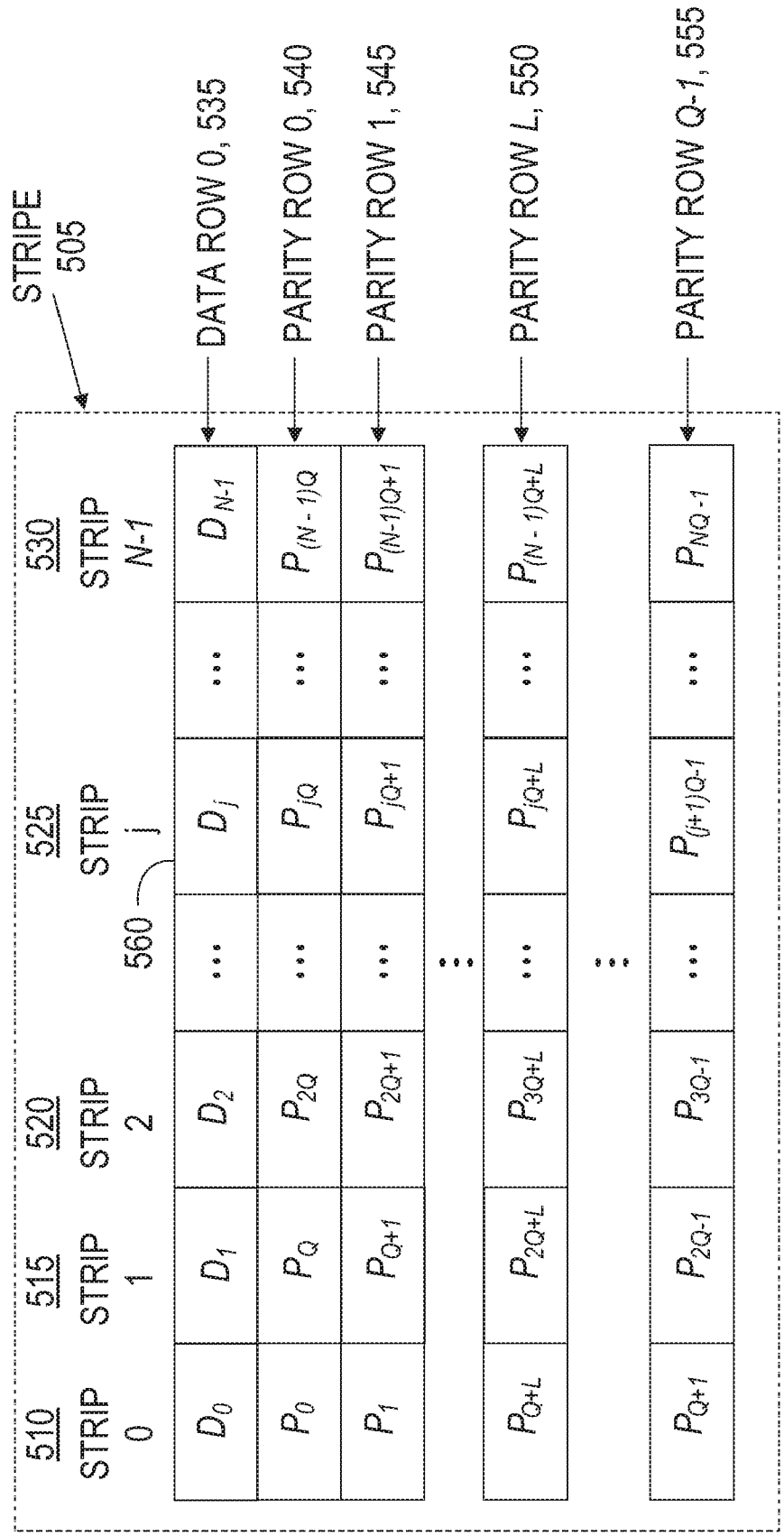

SYSTEM AND METHOD FOR TOLERATING MULTIPLE STORAGE DEVICE FAILURES IN A STORAGE SYSTEM WITH CONSTRAINED PARITY IN-DEGREE

FIELD OF THE INVENTION

The present invention relates to the field of data storage, and particularly to disk array systems. More specifically, this invention pertains to a method for constructing disk array systems that tolerate many combinations of failed storage devices without loss of data.

BACKGROUND OF THE INVENTION

Computer systems utilize data redundancy schemes such as parity computation to protect against loss of data on a storage device. A redundancy value is computed by calculating a function of the data of a specific word size, also referenced as a data element, across a quantity of similar storage devices, also referenced as data drives. One example of such redundancy is exclusive OR (XOR) parity that is computed as the binary sum of the data.

The redundancy values, hereinafter referenced as parity values, are stored on a plurality of storage devices in locations referenced as parity elements. In the case of a storage device failure that causes a loss of parity element values, the parity values can be regenerated from data stored on one or more of the data elements. Similarly, in the case of a storage device failure that causes a loss of data element values, the data values can be regenerated from the values stored on one or more of the parity elements and possibly one or more of the other non-failed data elements.

In Redundant Arrays of Independent Disk (RAID) systems, data values and related parity values are striped across disk drives. In storage subsystems that manage hard disk drives as a single logical direct (DASD) or network attached (NASD) storage device, the RAID logic is implemented in an array controller of the subsystem. Such RAID logic may also be implemented in a host system in software or in some other device in a network storage subsystem.

Disk arrays, in particular RAID-3 and RAID-5 disk arrays, have become accepted designs for highly available and reliable disk subsystems. In such arrays, the XOR of data from some number of disks is maintained on a redundant disk (the parity drive). When a disk fails, the data on it can be reconstructed by exclusive-ORing the data and parity on the surviving disks and writing this data into a spare disk. Data is lost if a second disk fails before the reconstruction is complete.

RAID-6 is an extension of RAID-5 that protects against two drive failures. There are many other RAID algorithms that have been proposed to tolerate two drive failures: for example, Reed-Solomon [reference is made to I. S. Reed, et. al., "Polynomial codes over certain finite fields," Journal of the Society for Industrial and Applied Mathematics, vol. 8, pp. 300-304, 1960], Blaum-Roth [reference is made to M. Blaum, et. al., "On lowest density MDS codes," IEEE Transactions on Information Theory, vol. 45, pp. 46-59, 1999], EvenOdd [reference is made to M. Blaum, et. al., "EVENODD: an efficient scheme for tolerating double disk failures in RAID architectures," IEEE Transactions on Computers, vol. 44, pp. 192-202, 1995], Row-Diagonal Parity [reference is made to P. Corbett, et al., "Row-diagonal parity technique for enabling recovery from double failures in a storage array," (U.S. patent application US 20030126523)], XCode [reference is made to L. Xu, et. al., "X-code: MDS array codes with optimal encoding," IEEE Transactions on Information Theory, pp. 272-276, 1999], ZZS [reference is made to G. V. Zaitsev, et. al., "Minimum-check-density codes for correcting bytes of errors," Problems in Information Transmission, vol. 19, pp. 29-37, 1983], BCP [reference is made to S. Baylor, et al., "Efficient method for providing fault tolerance against double device failures in multiple device systems," (U.S. Pat. No. 5,862,158)], and LSI [reference is made to A. Wilner, "Multiple drive failure tolerant raid system," (U.S. Pat. No. 6,327,672 B1)]. There have been a few additional extensions that protect against multiple drive failures: for example, Reed-Solomon [referenced above], EO+ [reference is made to M. Blaum, et. al., "MDS array codes with independent parity symbols," IEEE Transactions on Information Theory, vol. 42, pp. 529-542, 1996], and [reference is made to copending U.S. patent application Ser. No. 10/956,468, filed Sep. 30, 2004, which is incorporated by reference].

More recently, storage systems have been designed wherein the storage devices are nodes in a network (not simply disk drives). Such systems may also use RAID techniques for data redundancy and reliability. The present invention is applicable to these systems as well. Though the description herein is exemplified using the disk array, it should be clear to one skilled in the art how to extend the invention to the network node application or other systems built from storage devices other than disks.

Although conventional RAID technology has proven to be useful, it would be desirable to present additional improvements. As can be seen by the various conventional RAID techniques that have been used or proposed, none has been a perfect solution to the variety of requirements that the computer industry places on a storage subsystem. Many conventional systems are complex, requiring extensive computer overhead. Furthermore, many conventional systems have excessive disk IO requirements for certain operations. Others require a large number of drives in the system, and the use of more drives reduces overall system reliability. Many conventional codes that tolerate T failures (that is, all possible combinations of T drive failing), cannot tolerate any combination of more than T drives failing. Conventional RAID techniques that can tolerate additional combinations of failures beyond T have a higher reliability than those that do not.

What is therefore needed is a system, a computer program product and an associated method for enabling recovery from failures in a storage system that is simple, can handle a large range of failure cases, and has reasonable performance properties. The need for such a solution has heretofore remained unsatisfied.

SUMMARY OF THE INVENTION

The present invention satisfies this need, and presents a system, a computer program product, and an associated method (collectively referred to herein as "the system" or "the present system") for tolerating multiple storage device failures in a storage system with constrained parity in-degree, thus enabling efficient implementation of operations required of a storage subsystem.

The present system can tolerate as many as all combinations of T failures, for some parameter T. A feature of the invention is that every data element is redundantly stored in exactly T parity elements; that is, the data out-degree for each data element is exactly T. This is an optimum value for any code that tolerates all combinations of T failures. Consequently, the present system has optimal update 10 requirements among codes of high fault-tolerance.

Another feature of the invention is that the array size can expand beyond a minimum without changing the complexity of the computer overhead.

A further feature of the invention is that every parity element is computed from some number $K<T$ data elements; that is, the parity in-degree is exactly K. This feature allows for a number of advantages of the present system. The set of data and parity elements that are directly related to a single data element through the parity formulas is limited by at most $(K-1)T$, which is independent of the array size. Consequently, an update occurring to one data element requires only a fixed subset of the array to be "locked" rather than the entire array, to prevent the storage system from attaining an undesirable inconsistent state. Such states can occur if a failure happens while two simultaneous updates are in progress to overlapped lock-zones.

Another advantage of the parity in-degree being exactly K is that parity computations require fewer resources because all parity equations have only K inputs (K is fixed independent of the array size). In contrast, all parity computations in a conventional RAID5 code require $N-1$ inputs where N is the array size. A further advantage of the parity in-degree being exactly K is that, only a subset of the entire array may be needed to rebuild the lost data or parity when a failure occurs, thereby improving rebuild time and costs. Yet another advantage of the parity in-degree being exactly K is that certain combinations of more than T failures can be tolerated by some embodiments of the present system, improving overall system reliability compared to conventional systems.

In yet another feature of the present invention both data elements and related parity elements are laid out on the disks together; that is, the data elements and parity elements from the same stripe, or code instance, both appear on each disk. The portion of the disk comprising both data elements and parity elements from the same stripe is referenced hereinafter as a strip. The term "vertical layout" is hereinafter used to refer to the property that strips within a stripe contain both data elements and parity elements. The term "horizontal layout" is hereinafter used to refer to the property that strips within a stripe contain only data elements or only parity elements exclusively.

Some operations that the storage system needs to perform require reading or writing at least one data element and one parity element at the same time or in parallel. In yet a further feature of the present invention, the vertical layout of the present system enables certain of these read or write operations to be performed by a single disk IO seek. Consequently, the present system reduces the disk IO overhead of these operations.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 2 comprises FIG. 2A and FIG. 2B and illustrates exemplary graphs representing a relationship of data elements to their associated parity elements and conversely;

FIG. 4 is comprised of FIG. 4A, FIG. 4B and FIG. 4C and represents another embodiment of the system of FIG. 1.

DETAILED DESCRIPTION OF PREFERRED EMBODIMENTS

Figure 1:
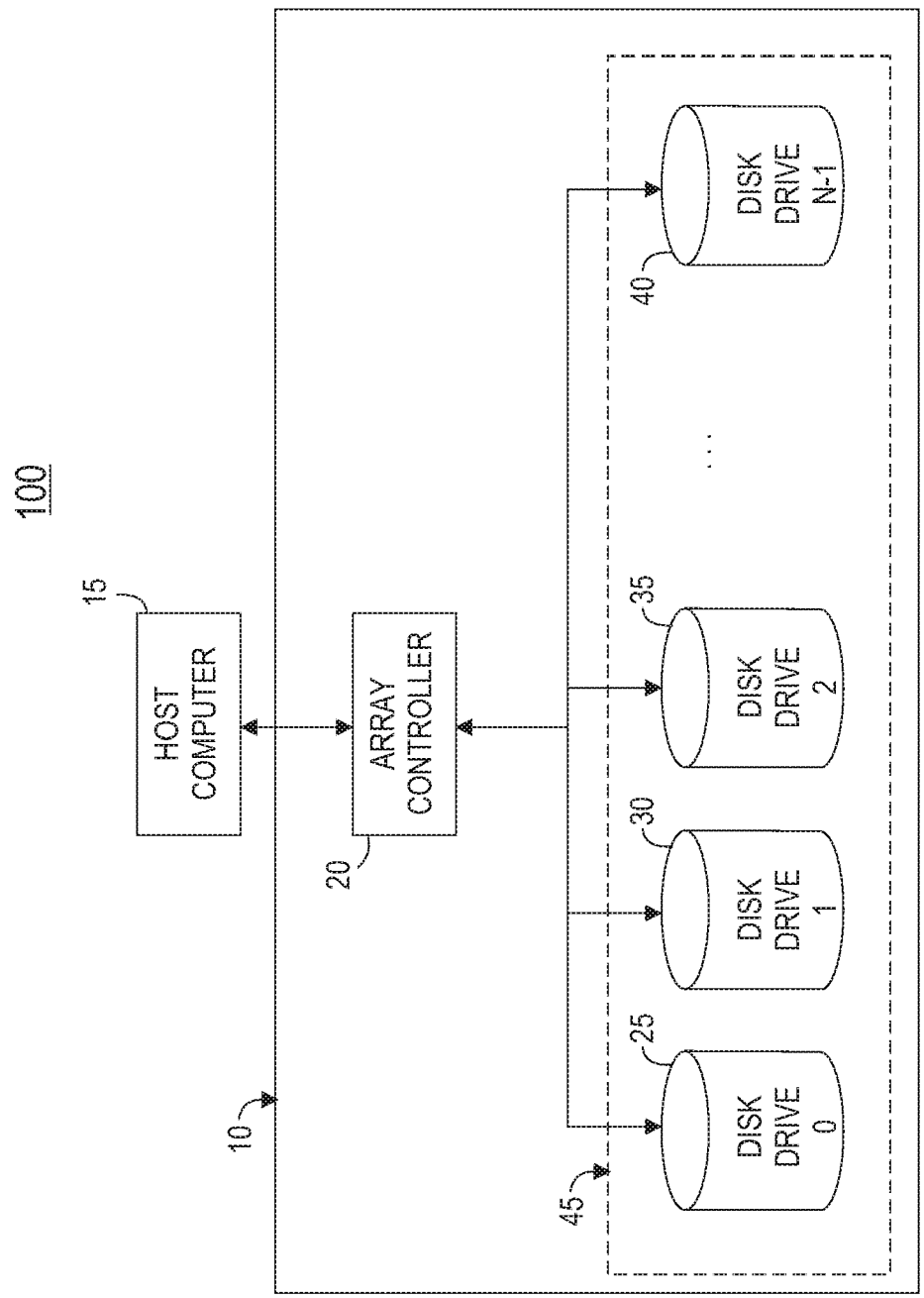
FIG. 1 is a schematic illustration of an exemplary environment in which a system and associated method for implementing a storage redundancy scheme wherein the parity in-degree is constrained.

FIG. 1 illustrates an exemplary environment (data storage system 100) in which a system and associated method (collectively referred to as "system" 10) for can be used for implementing a fault-tolerant storage system with constrained parity in-degree. A host computer 15 is connected to an array controller 20 of system 10. The host computer 15 stores data in an array of N disk drives: disk drive 0, 25, disk drive 1, 30, disk drive 2, 35, through disk drive N−1, 40 (referenced collectively as disk drives 45 or array 45). Parity is stored in the N disk drives 45 along with the host data.

Figure 2A:
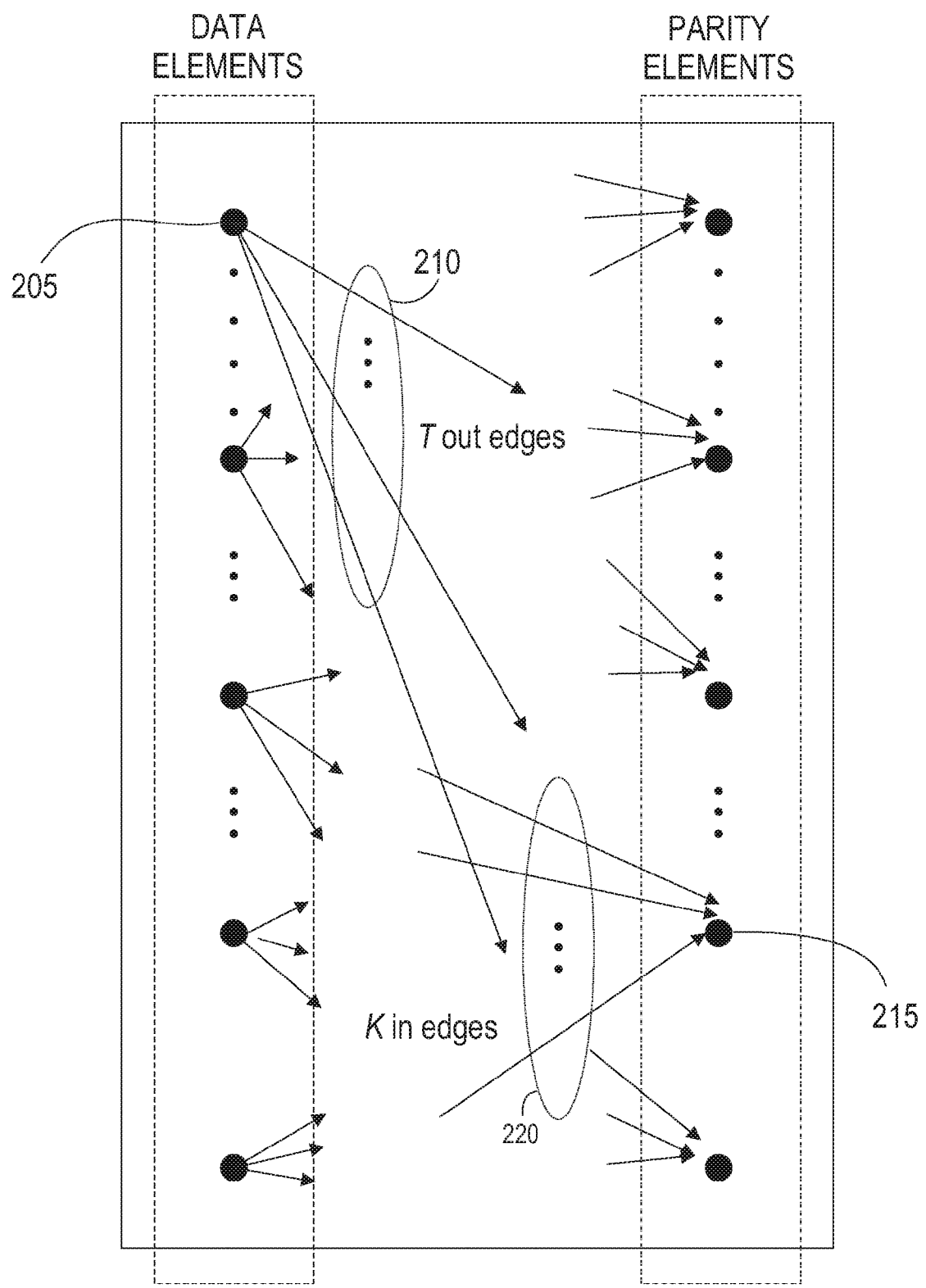
FIG. 2A illustrates the general matching.
Figure 2B:
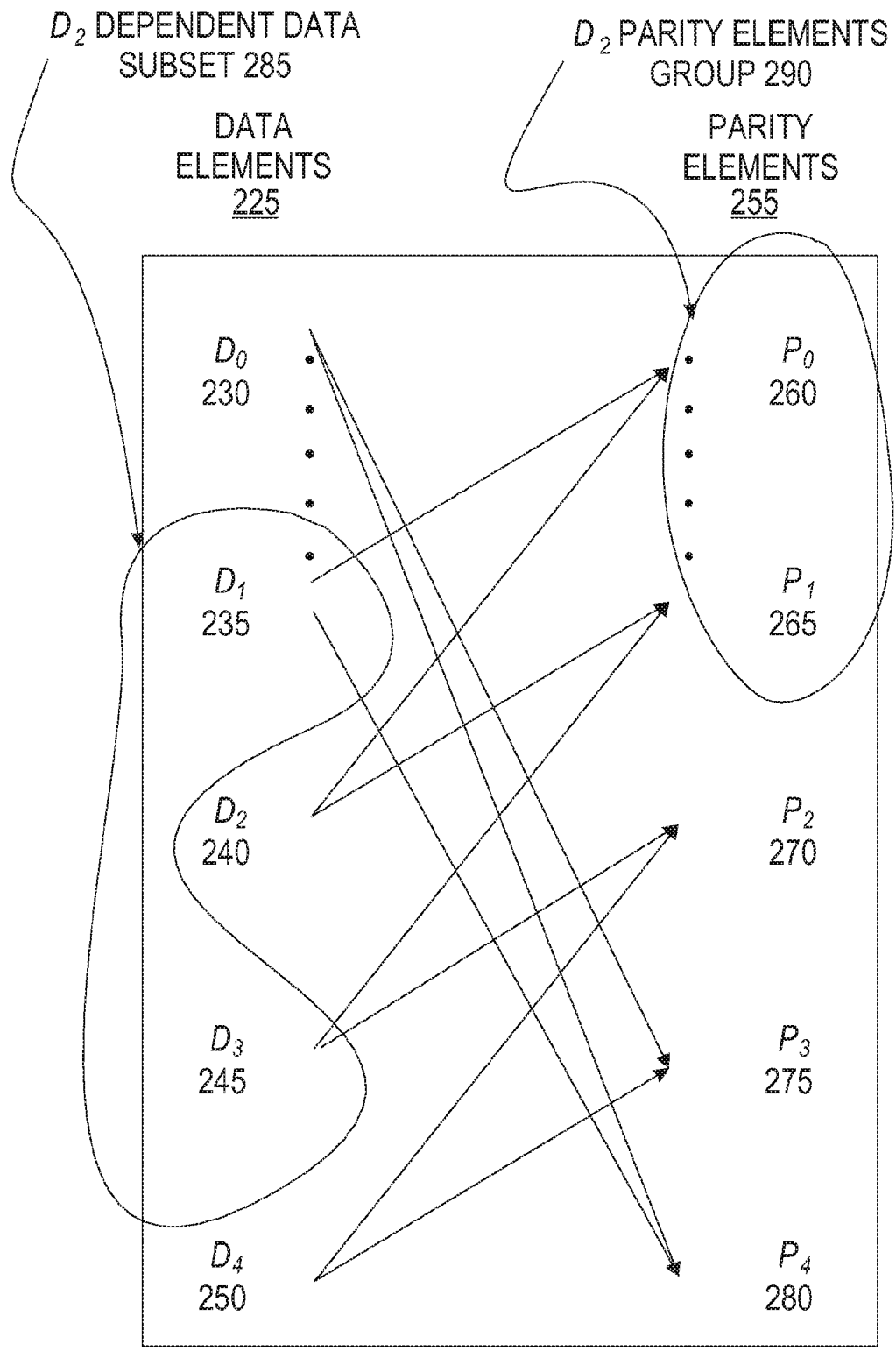
FIG. 2B illustrates a specific matching of one embodiment of the system of FIG. 1.

With further reference to FIG. 2 (FIGS. 2A, 2B), system 10 comprises an exemplary matching of data elements to parity elements (further referenced herein as "the matching") in which the system can recover from any combination of T disk failures. In this matching, each data element is matched with or touches exactly T parity elements, hereinafter referred to as the data out-degree equals T. In addition, each parity element is matched with or is touched by exactly K data elements, hereinafter referred to as the parity in-degree equals K. The present system requires the property that $2 \leq K \leq T$. This property is graphically represented in FIG. 2A in which an exemplary data element 205 has data out-degree, 210, equal to T. An exemplary parity element 215 has parity in-degree, 220, equal to K.

In FIG. 2B, a particular instance comprising $T=2$ and $K=2$ on $N=5$ drives is shown. Data elements 225 comprise $D_0$, 230, $D_1$, 235, $D_2$, 240, $D_3$, 245, and $D_4$, 250. Parity elements 255 comprise $P_0$, 260, $P_1$, 265, $P_2$, 270, $P_3$, 275, and $P_4$, 280. Each of the parity elements 255 is computed by some predetermined formula (for example, XOR) of the data elements 225 that touch one of the parity elements 255 in the matching. Dependent data elements of a specific data element comprise a subset of data elements that can be reached in the matching from the specific data element through the matching parity elements of the specific data element. In FIG. 2B, the dependent data elements are indicated by a subset 285 for data element $D_2$, 240, as connected through parity elements in a group 290.

Figure 3:
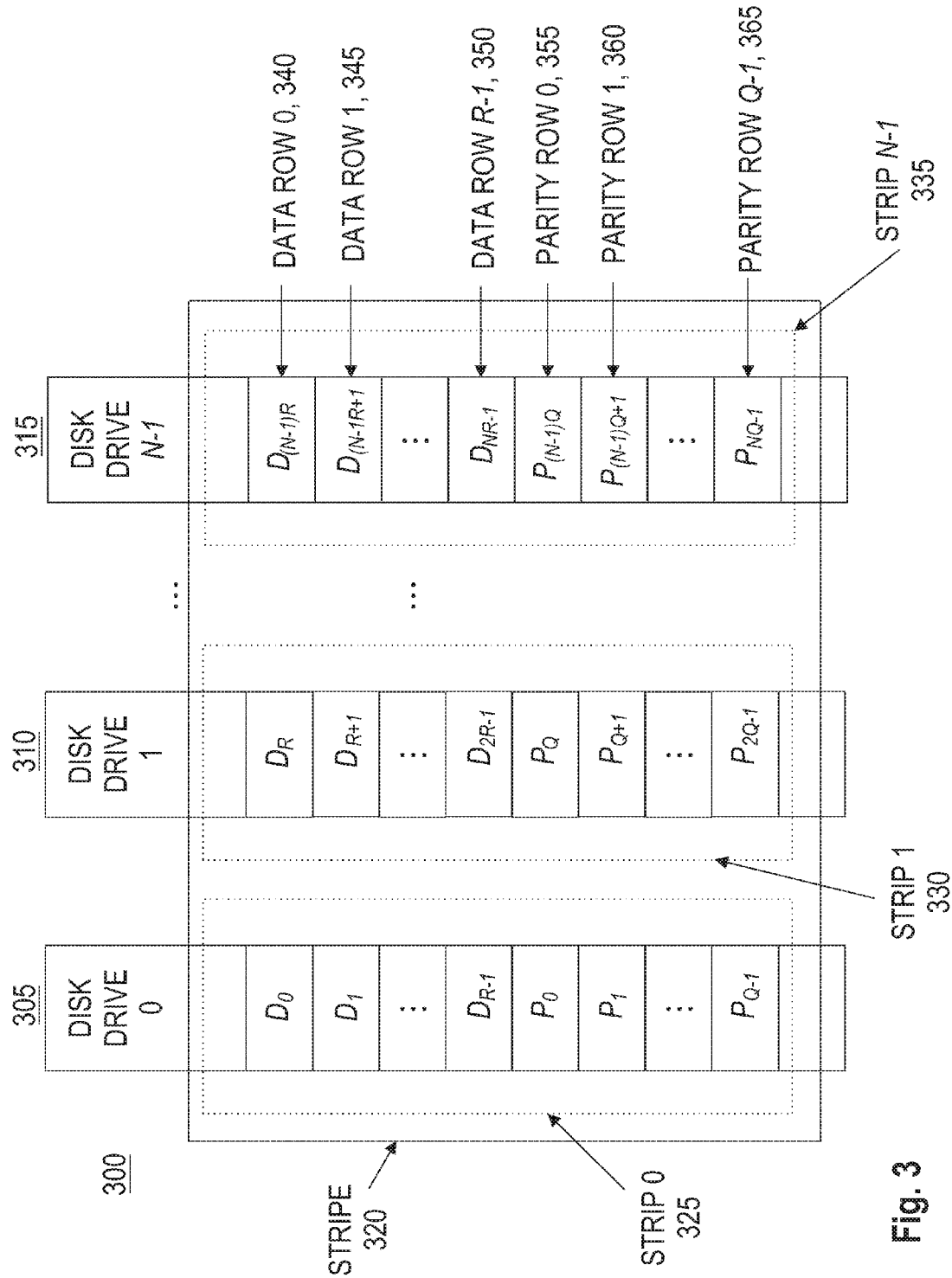
FIG. 3 is a diagram illustrating an exemplary layout showing a two-dimensional data and parity layout in the system of FIG. 1.

FIG. 3 represents a general layout 300 of data and parity elements for the data storage system 100 of FIG. 1. The N disks are designated: disk drive 0, 305, disk drive 1, 310, through disk drive N−1, 315. A portion of each disk drive is selected and collectively these portions form a stripe 320, or one instance of system 10. The portion of each disk drive in a stripe is referenced hereinafter as a strip. Strip 0, 325, strip 1, 330, through strip N−1, 335, together form stripe 320. Each strip is further divided into the same number of elements, of the same size (e.g., byte, word, block, etc.). The elements of each strip are further designated to be either data elements labeled $D_i$ ($0 \leq i \leq NR-1$) or parity elements labeled $P_j$ ($0 \leq j \leq NQ-1$).

In general, system 10 requires that there be at least one data element and at least one parity element per strip and that the same number of data elements (parity elements, respectively) is designated for each strip in the stripe. Horizontally, the elements at the same offset within each stripe form a row of elements in the stripe. In FIG. 3, there are R+Q total numbers of rows, of which R represent rows of data elements: data row 0, 340, data row 1, 345, through data row R−1, 350; and Q represent rows of parity elements: parity row 0, 355, parity row 1, 360, through parity row Q−1, 365. System 10 further requires that $R \leq Q$.

It should be clear to those skilled in the art that system 10 can be implemented in multiple stripes on the same disks or on subsets or supersets of the disks of one implementation. It should also be clear that each implementation may have different values for the parameters N, T, K, R and Q.

The efficiency of a redundancy scheme is given by the ratio of the number of data elements to the total number of data elements and parity elements. In system 10, this value is given by the formula:

$$\frac{NR}{N(R+Q)} = \frac{R}{R+Q}. \quad (1)$$

Figure 4A:
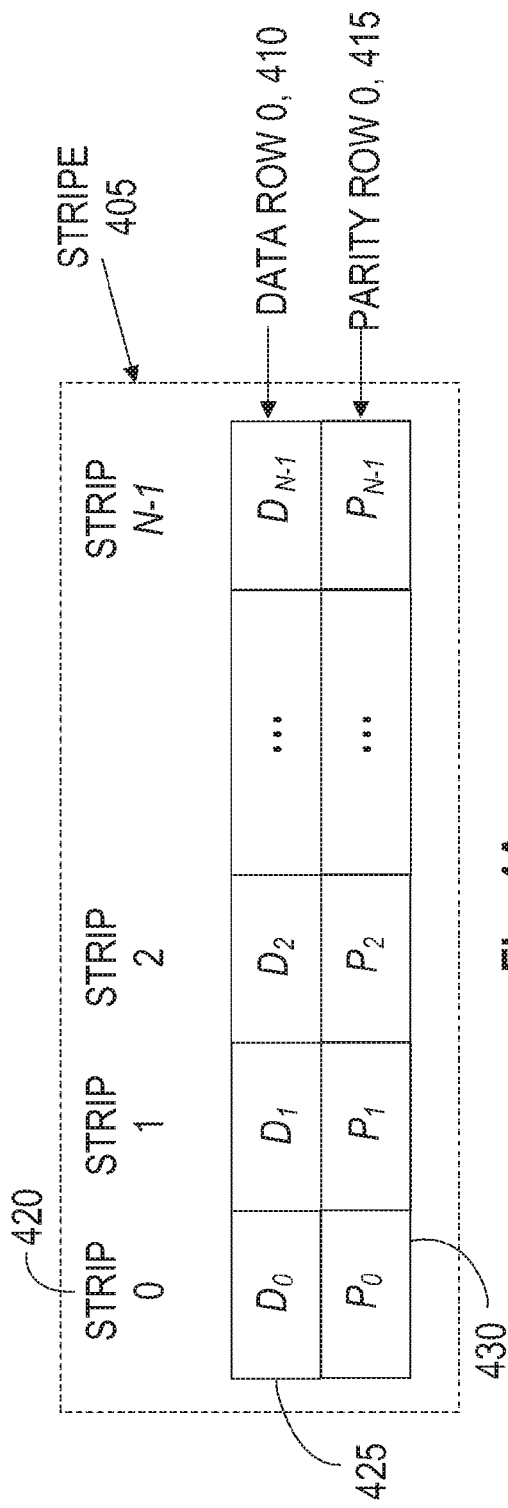
FIG. 4A is a block diagram illustrating an embodiment of the system of FIG. 1 wherein there is exactly one data element and one parity element in each strip.
Figure 4B:
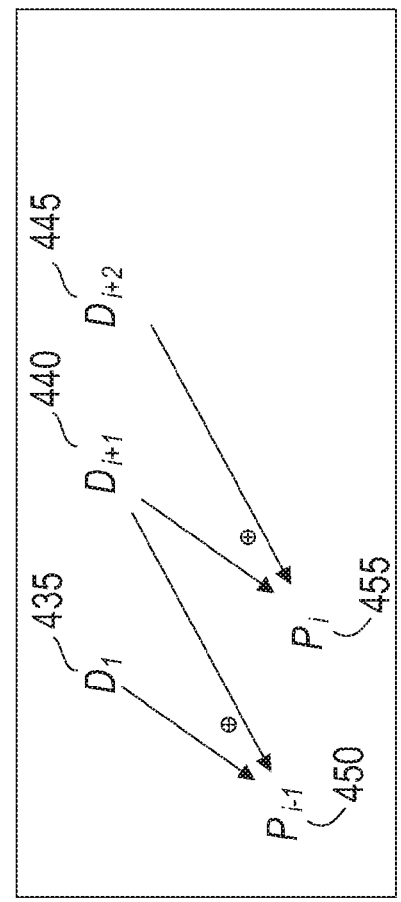
FIG. 4B is a diagram representing the relationship of one data element to its two dependent data elements and two parity elements in the embodiment of the system represented in FIG. 4A and wherein the system can tolerate 2 faulting storage devices.
Figure 4C:
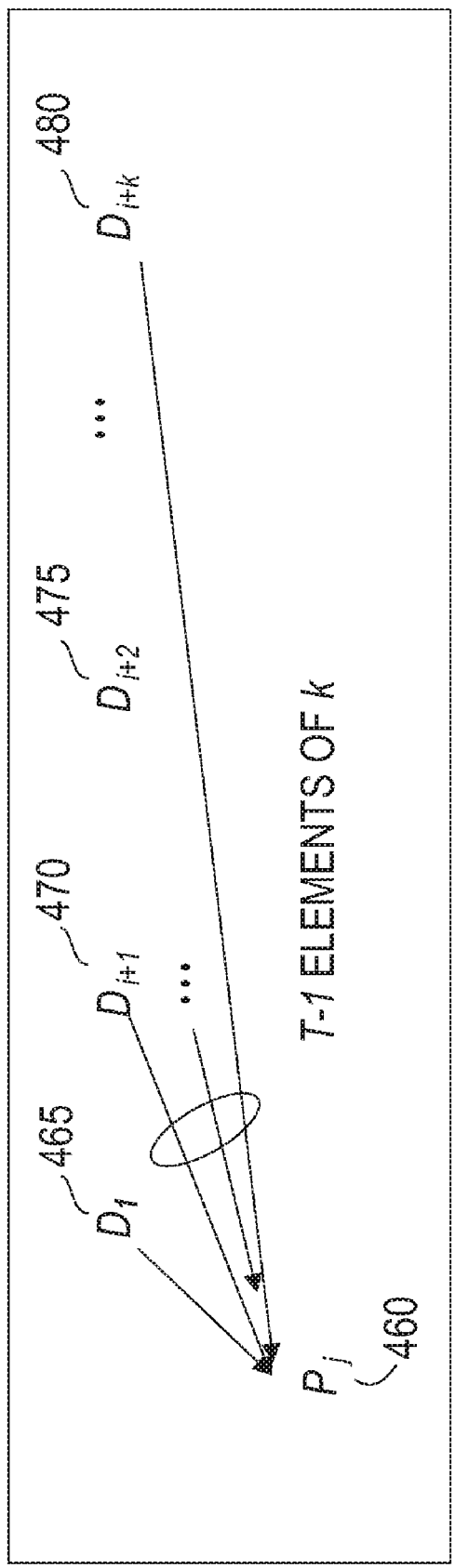
FIG. 4C is a diagram representing the relationship of one data element to one of its T parity elements in the embodiment of the system represented in FIG. 4A and wherein the system can tolerate T faulting storage devices.

FIG. 4 comprises FIG. 4A, FIG. 4B and FIG. 4C. In FIG. 4A, a representation of a stripe 405, of system 10 is given wherein the parameters R=Q=1 are chosen. A consequence of this choice is that K=T, that is, parity in-degree and the data out-degree are the same. There is for this example one data row, data row 0, 410, and one parity row, parity row 0, 415. This embodiment has the maximum storage efficiency of 50% of the possible embodiments of system 10 as seen in equation (1). It is seen in FIG. 4A that each strip of the stripe has exactly one data element and one parity element. For example, strip 0, 420, has one data element, $D_0$, 425, and one parity element, $P_0$, 430.

One matching for stripe 405 that can tolerate two failed disks is represented in FIG. 4B. In this matching, T=2 and K=2. That is, the parity in-degree and the data out-degree are both equal to 2. Data elements are shown in general as $D_i$, 435, $D_{i+1}$, 440, and $D_{i+2}$, 445. Parity elements are shown in general as $P_{i-1}$, 450, and $P_i$, 455. The diagram in FIG. 4B shows one implementation of the relationship of data element $D_{i+1}$, 440 to the parity elements it touches, $P_{i-1}$, 450 and $P_i$, 455. It also shows the dependent data elements $D_i$, 435, and $D_{i+2}$, 445. It is assumed that all subscripts in this representation are taken modulo N. A complete data element to parity element relationship for this embodiment when N=5 is shown in FIG. 2B.

The matching of FIG. 4B has the following properties, described in general terms. The construction works for any $N \geq 4$, so this matching in system 10 supports very small array sizes or arbitrarily large array sizes. Smaller array sizes have generally higher reliability because there are fewer devices to fail. Further, the left and right neighbors of each data element forms its dependent data element set. When multiple updates are occurring to the data elements in a stripe, only a few data elements and parity elements (in this case, four comprising two data elements and two parity elements) need to be "locked" to prevent inconsistent states that may arise as a result of failures occurring during updates. Another property is extremely simple parity computations and equations. These formulas are cyclic; a pattern for one data element or one parity element can be derived by a rotation of the pattern for any other data element.

Another property of the matching of system 10 represented in FIG. 4B allows an update to a data element to be performed using only five IO seeks. In comparison, most conventional 2-fault-tolerant RAID schemes require six IO seeks. In the present matching, five IO seeks are achieved by an algorithm that reads with two IO seeks two neighbors of a data element (the dependent data element set), computing the parity as indicated in FIG. 4B, then writing with three IO seeks the new data value to the data element and the new parity values to the parity elements. Yet another property provides a write to more than one sequential element in stripe 410 that can have reduced IO seek costs compared to conventional systems. For example, in general terms, a simultaneous update to data elements $D_2$ and $D_3$ requires updating parity elements $P_0$, $P_1$ and $P_2$. Because $P_2$ lies contiguous with $D_2$, these two elements may be updated with one IO seek. In addition, as indicated above, only two reads of dependent data elements are required because $D_2$ and $D_3$ are mutually dependent; consequently, only $D_1$ and $D_4$ need be read.

The preferred embodiment of the LSI code [reference is made to A. Wilner, "Multiple drive failure tolerant raid system," (U.S. Pat. No. 6,327,672 B1)] also has a simple pairing of data elements to parity elements as the preferred embodiment of FIG. 4B. The LSI code does not store the parity elements on the same strips with the data elements in the way of system 10. System 10 improves on a conventional LSI code in a number of ways. First, the smallest array size supported by the conventional LSI code is 6, whereas system 10 can be implemented on as few as 4 disks. Second, the conventional LSI code cannot achieve the IO seek savings of system 10 during multiple sequential element updates because no data elements and parity elements from the same stripe are contiguous on the same disks.

Another matching for the present invention, represented in stripe 405, can tolerate T failures with $T \geq 2$. As before, the embodiment of FIG. 4A requires K=T. FIG. 4C illustrates a matching wherein one of the parity elements, $P_j$, 460, for a data element $D_i$, 465, is computed from $D_i$, 465 and a subset of size T−1 selected from the data elements $D_{i+1}$, 470, $D_{i+2}$, 475, through $D_{i+k}$, 480, for some $k \geq T-1$.

As before, it is assumed that all subscripts in this representation are taken modulo N. The construction places this parity element $P_j$, 460, at some offset i−j from data element $D_i$, 465. A cyclic application of this rule suffices to define one embodiment of system 10 of FIG. 4A and the matching of FIG. 4C. Not all such selections of subsets or all such offsets of the relative placement of data element to parity element provide a T-fault-tolerant system. Table 1 shows some examples of selection of subset and offset that achieve the indicated fault-tolerance. The T parameter shows the fault-tolerance level. The Set column indicates the subset of indices that are added to i to define the parity element equation. For example, in general terms, if Set={0, 1}, then $D_i=D_{i+0}$ and $D_{i+1}$ are paired together. Offset is the left placement of the parity element with respect to $D_i$.

TABLE 1

Examples of system 10 embodied by FIG. 4A and FIG. 4C.

| T | Set | Offset | Array Sizes |
|---|-----|--------|-------------|
| 2 | {0,1} | 1 or 2 | N ≥ 4 |
| 2 | {0,2} | 1 | N ≥ 5 |
| 3 | {0,1,2} | 2 | N = 6 and N ≥ 8 |
| 3 | {0,1,3} | 3 | N ≥ 7 |
| 3 | {0,2,3} | 2 | N ≥ 7 |
| 4 | {0,1,2,4,5} | 2 | N ≥ 10 |
| 4 | {0,1,3,5} | 3 | N = 10 and N ≥ 12 |
| 4 | {0,1,2,4} | 2 | N ≥ 11 |
| 4 | {0,2,3,4} | 1 | N ≥ 11 |
| 5 | {0,2,3,7} | 1 | N ≥ 11 |
| 5 | {0,2,3,4,6} | 3 | N = 12 and N ≥ 15 |
| 5 | {0,1,2,4,10} | 5 | N = 12 and N ≥ 16 |
| 5 | {0,4,5,7,8} | 4 | N ≥ 13 |
| 5 | {0,1,3,5,6} | 4 | N ≥ 14 |
| 6 | {0,2,3,4,8,9} | 3 | N = 17 and N ≥ 21 |
| 6 | {0,2,3,7,9,13} | 3 | N ≥ 18 |

Figure 5B:
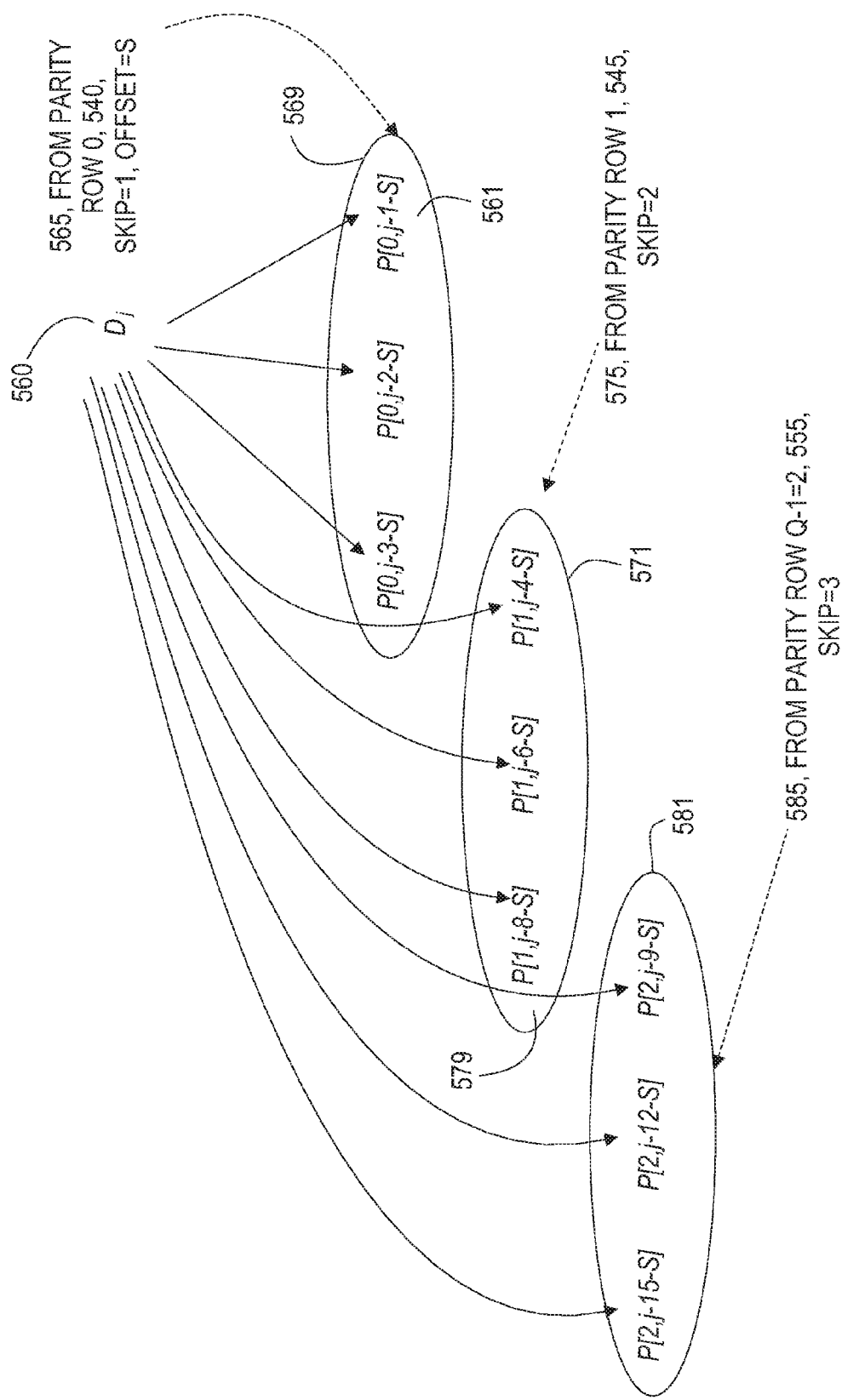
FIG. 5 is comprised of FIG. 5A and FIG. 5B and represents a further embodiment of the system of FIG. 1 that can tolerate T faulting storage devices.

Other configurations and embodiments of system 10 are possible. FIG. 5A and FIG. 5B represent another embodiment of system 10 wherein the fault-tolerance level T is divisible by the parity in-degree parameter K and T is greater than or equal to K. In addition, the number of data rows R is equal to 1 and the number of parity rows Q is equal to T/K. (The case T=K is also described by FIG. 4A). In the embodiment of FIG. 5A, each data element touches K parity elements in each parity row.

Stripe 505 comprises strip 0, 510, strip 1, 515, strip 2, 520, to strip j, 525, and further to strip N−1, 530. Stripe 505 further comprises data row 0, 535, parity row 0, 540, parity row 1, 545, through parity row L, 550, and further to parity row Q−1, 555. Data element $D_j$, 560, touches parity elements in parity row 0, 540, in a sequential pattern moving to the left and starting at some offset S with wrap-around from left to right. In parity row 1, 545, data element $D_j$, 560, touches a sequence of parity elements starting one position to the left of the last parity element touched in parity row 0, 540, and moving again to the left, but skipping every other parity element, with wrap-around from left to right. Continuing, in parity row L, 550, data element $D_j$, 560, touches a sequence of parity elements starting one position to the left of the last parity element touched in the preceding row, moving again left, skipping to the (L+1) next parity element with wrap-around. This continues until the last parity row Q−1, 555, has had K parity elements touched by $D_j$ according to this rule.

FIG. 5B illustrates an exemplary matching according to the rules described for FIG. 5A wherein T=9, K=3 and Q=3. Parity element $P_{jQ+L}$ that is the Lth parity element in the jth strip is re-labeled as P[L, j]. Data element $D_j$, 560, is matched with three parity elements, P[0, j−1−S], P[0, j−2−S], P[0, j−3−S], collectively referenced as 565, from parity row 0, 540. The first parity element, P[0, j−1−S], 561, of the parity elements 565, is offset S steps to the left from data element $D_j$, 560. Parity elements 565 are sequential moving to the left with a skip of 1. Data element $D_j$, 560, is further matched with three parity elements, P[1, j−4−S], P[1, j−6−S], P[1, j−8−S], collectively referenced as 575, from parity row 1, 545. The first parity element, P[1, j−4−S], 571, of the parity elements 575, is offset one step to the left from the last parity element P[0, j−3−S], 569, of parity elements 565. Parity elements 575 are sequential moving to the left with a skip of 2. Continuing, data element $D_j$, 560, is further matched with three parity elements, P[2, j−9−S], P[2, j−12−S], P[2, j−15−S], collectively referenced as 585, from the last parity row Q−1=2, 555. The first parity element, P[2, j−9−S], 581, of the parity elements 585, is offset one step to the left from the last parity element P[1, j−8−S], 579, of parity elements 575. Parity elements 585 are sequential moving to the left with a skip of 3.

In mathematical terms, the data element $D_j$ touches the parity elements given by $$P[L, j-(K-1)L(L+1)/2-s(L+1)-S], s=1, \ldots K. \quad (2)$$

In equivalent mathematical terms, parity P[L, j] is computed by the formulas:

$$P[L, j] = \bigoplus_{s=1}^{K} D_{j+(K-1)L(L+1)/2+s(L+1)+S}. \quad (3)$$

In equation (2), the second index for P[L, j] is taken modulo N; in equation (3), the subscript of the symbol D. is also taken modulo N. Table 2 shows a range of values for which these formulas produce valid T-fault-tolerant embodiments of system 10 of FIG. 5. Other values are possible as well.

TABLE 2

Examples of system 10 embodied by FIG. 5 and formulas (2) and (3).

| K | T | S | Array Sizes |
|---|---|---|-------------|
| 2 | 2 | 0 | N ≥ 4 |
| 2 | 4 | 0 | N ≥ 6 |
| 2 | 6 | 0 | N ≥ 10 |
| 2 | 8 | 0 | N ≥ 15 |
| 2 | 10 | 0 | N = 11 and N ≥ 21 |
| 3 | 3 | 3 | N ≥ 8 |
| 3 | 6 | 3 | N = 12 and N ≥ 14 |
| 3 | 9 | 3 | N ≥ 16 except N = 18 |

These examples show that system 10 can be used to build simple and highly fault-tolerant storage systems.

Figure 6A:
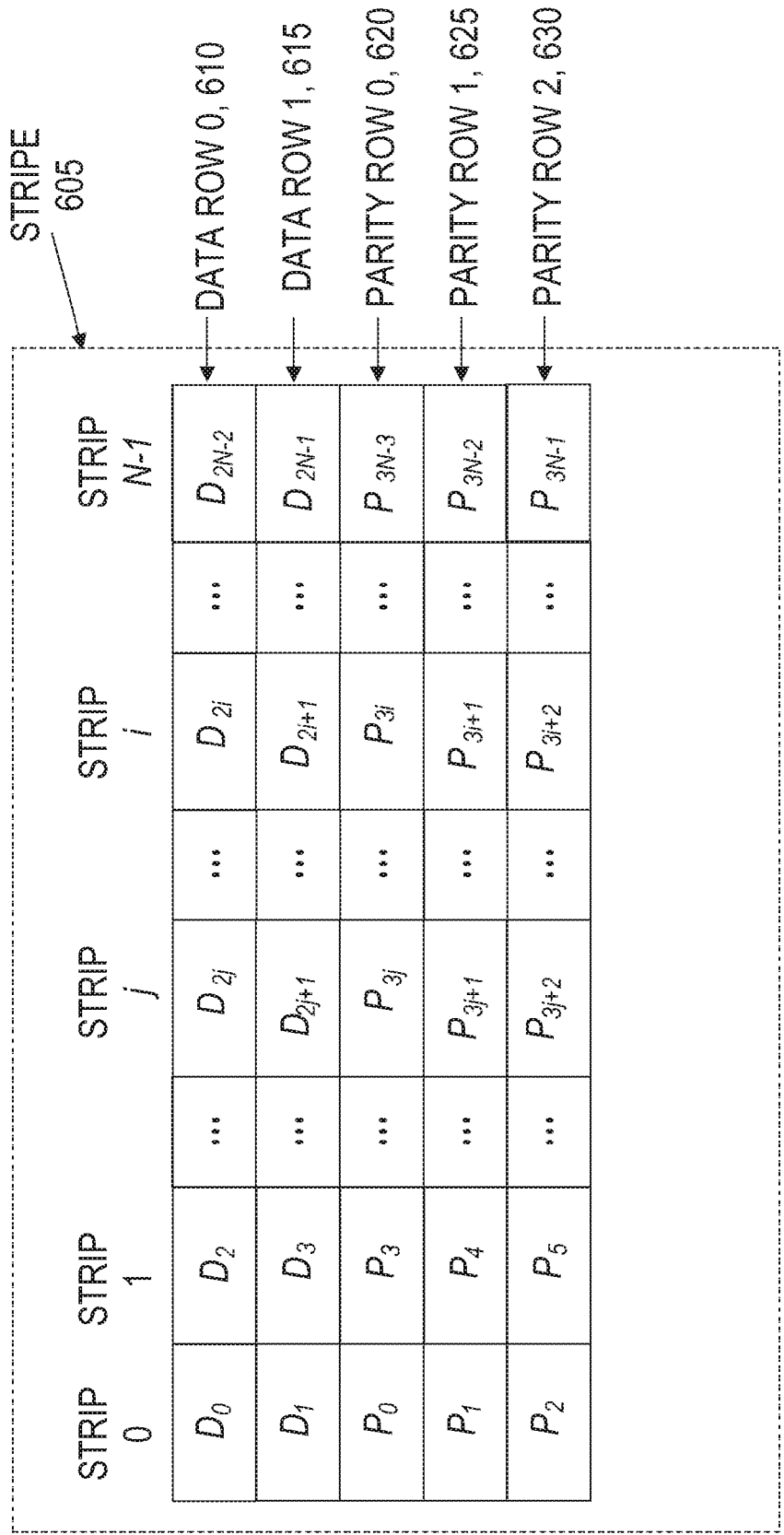
FIG. 6 is comprised of FIG. 6A, FIG. 6B and FIG. 6C and represents yet another embodiment of the system of FIG. 1 that can tolerate 3 faulting storage devices.
Figure 6B:
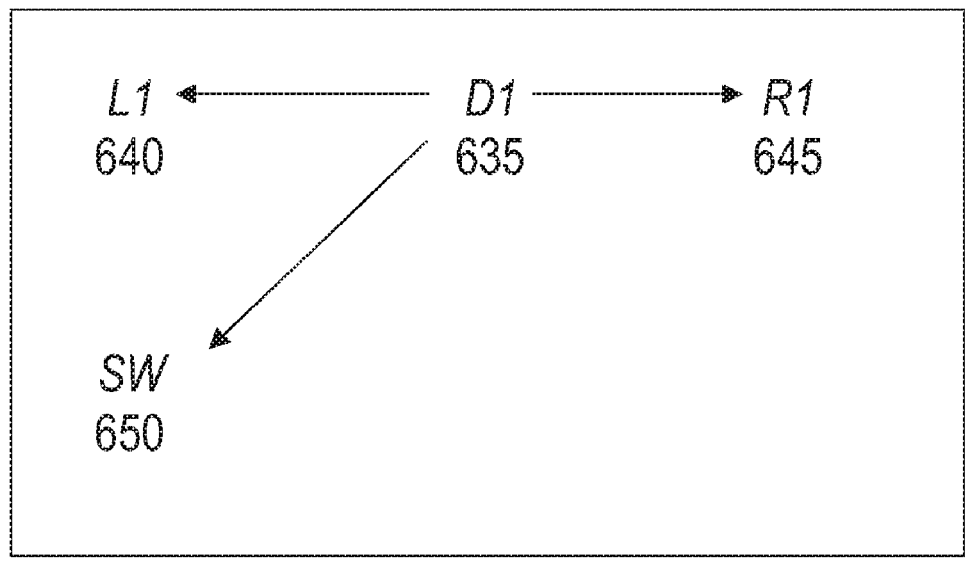

The data/parity element layout of yet another embodiment that is 3-fault-tolerant is given in FIG. 6A. Stripe 605 comprises data row 0, 610, and data row 1, 615. In addition, stripe 605 comprises parity row 0, 620, parity row 1, 625, and parity row 2, 630. This embodiment has the parity in-degree K=2. FIG. 6B shows that an exemplary data element D1, 635, that represents a data element in data row 0, 610, is paired into one parity element of parity row 0, 620, with its left neighbor L1, 640, in data row 0, 610. Data element D1, 635, is paired into another parity element in parity row 0, 620, with its right neighbor R1, 645, also in data row 0, 610. Data element D1, 635, is further paired into yet a third parity element in parity row 2, 630, with its lower-left (southwest) neighbor SW, 650, from data row 1, 615.

Figure 6C:
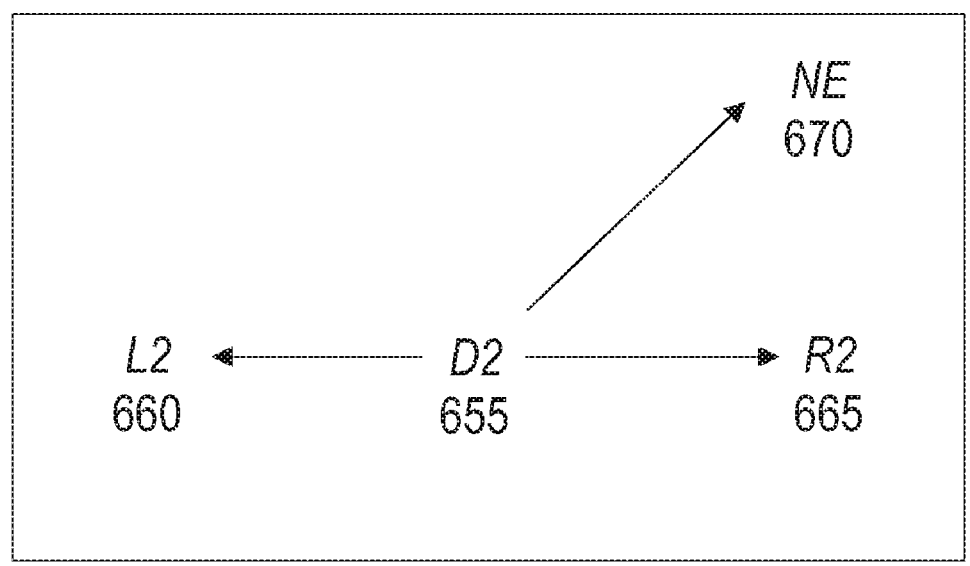

Similarly, FIG. 6C shows an exemplary data element D2, 655, from data row 1, 615, and a pairing of data element D2, 655, with three other data elements. Data element D2, 655, is paired into one parity element of parity row 1, 620, with its left neighbor L2, 660, in data row 1, 615. Data element D2, 655, is paired into another parity element in parity row 1, 615, with its right neighbor, R2, 665, also in data row 1, 615. Data element D2, 655, is further paired into yet a third parity element in parity row 2, 630, with its upper-right (northeast) neighbor NE, 670, from data row 0, 610.

The parity placement equations for this embodiment of FIG. 6 (FIGS. 6A, 6B, 6C) are:

$$P_{3j} = D_{2j+2} \hat{+} D_{2j+4}$$

$$P_{3j+1} = D_{2j+3} \hat{+} D_{2j+5}$$

$$P_{3j+2} = D_{2j-3} \hat{+} D_{2j-2}$$

The first equation shows that the left-neighbor pairing from the data row 0, 610, is placed one strip to the left of the left-neighbor and into parity row 0, 620. The second equation show that the left-neighbor pairing from data row 1, 615, is placed one strip to the left of the left-neighbor and into parity row 1, 625. The third equation shows that the lower-left/upper-right neighbor pairing between data row 0, 610, and data row 1, 615, is placed into parity row 2, 630, on the strip to the right of the upper-right neighbor. It should be understood that subscripts for data elements are taken modulo 2N and for parity elements modulo 3N.

It can be seen that the data row 0, 610, and parity row 0, 620, comprise a subcode of the embodiment of FIG. 6 that is equivalent to the embodiment of FIG. 4A with K=2. Similarly, data row 1, 615, and parity row 1, 625, comprise a second subcode of the embodiment of FIG. 6 that is equivalent to another instance of the embodiment of FIG. 4A with K=2. Parity row 2, 630, comprises an interleaving of these two subcodes.

The embodiment of FIG. 6 is exemplary of other embodiments with the same parameters. This embodiment has 3-fault-tolerance whenever N≧6.

Figure 7A:
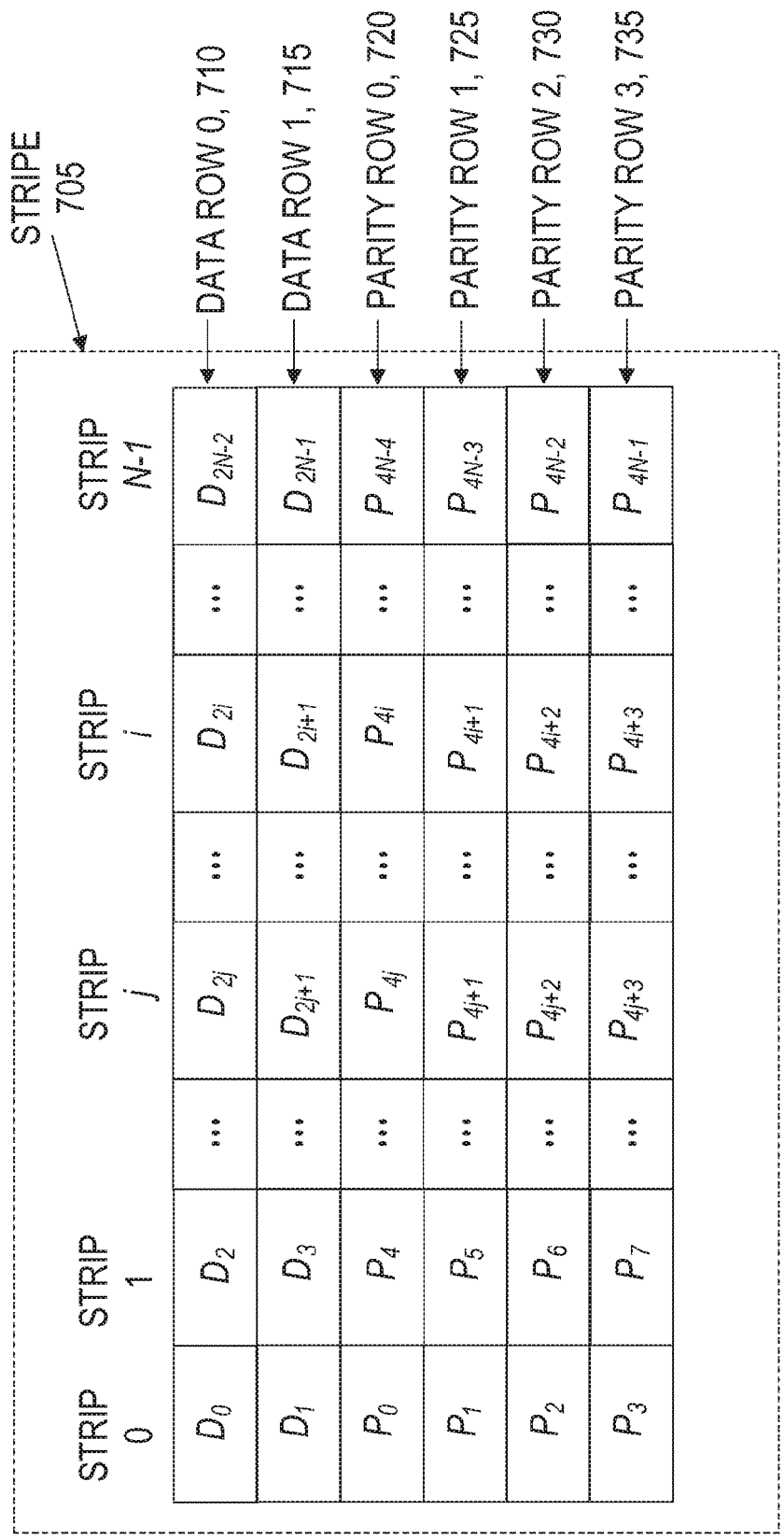
FIG. 7 is comprised of FIG. 7A, FIG. 7B and FIG. 7C and represents yet a further embodiment of the system of FIG. 1 that can tolerate 4 faulting storage devices.
Figure 7B:
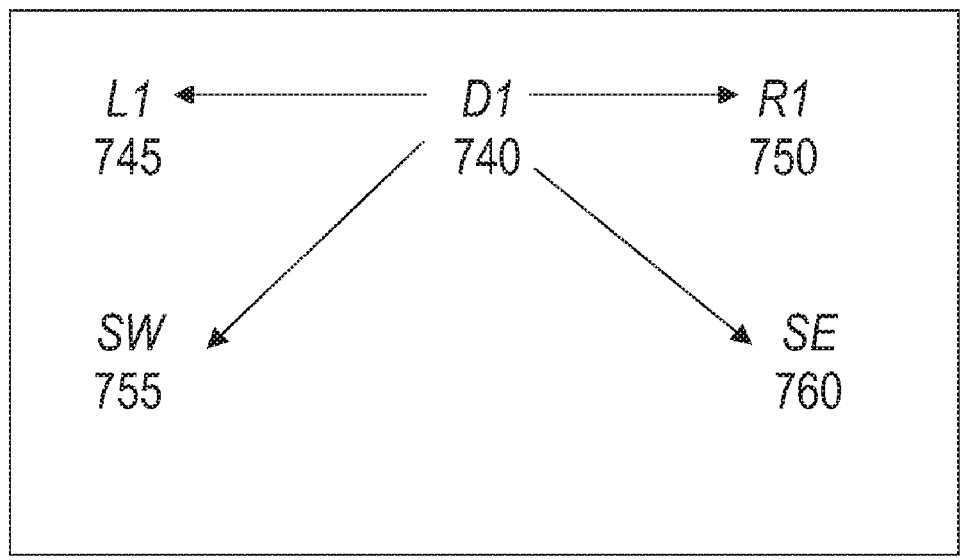
Figure 7C:
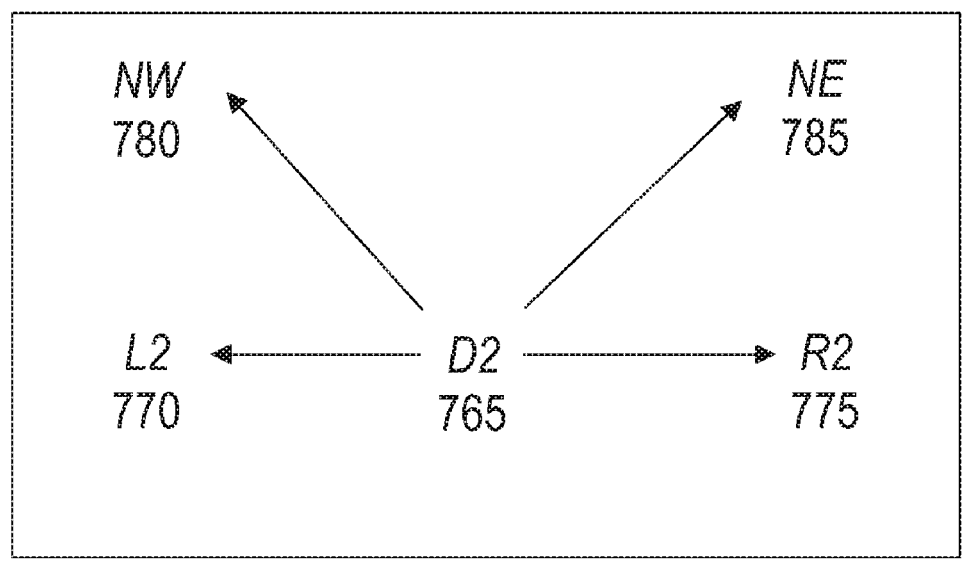

FIG. 7 (FIGS. 7A, 7B, 7C) provides yet another exemplary embodiment that is 4-fault-tolerant and also has K=2. This embodiment extends the embodiment of FIG. 6 described above by adding an additional row of parity and an additional level of fault-tolerance. FIG. 7A shows the data/parity element layout of stripe 705 with two data rows (data row 0, 710 and data row 1, 715) and two parity rows (parity row 0, 720, parity row 1, 725, parity row 2, 730, and parity row 3, 735). FIG. 7B shows the pairings of a data element D1, 740, of data row 0, 710, with both its left L1, 745, and right R1, 750, neighbors, as well as its lower-left (SW, 755) and lower-right (SE, 760) neighbors from data row 1, 715. Similarly, FIG. 7C shows the pairings of a data element D2, 765, of data row 1, 715, with both its left L2, 770, and right R2, 775, neighbors, as well as its upper-left (NW 780) and upper-right (NE, 785) neighbors from data row 0, 710.

The parity placement equations for FIG. 7 are:

$$P_{4j} = D_{2j+2} \hat{+} D_{2j+4}$$

$$P_{4j+1} = D_{2j+3} \hat{+} D_{2j+5}$$

$$P_{4j+2} = D_{2j-5} \hat{+} D_{2j-4}$$

$$P_{4j+2} = D_{2j-6} \hat{+} D_{2j-3}$$

The first equation shows that the left-neighbor pairing from data row 0, 710, is placed one strip to the left of the left-neighbor and into parity row 0, 720. The second equation shows that the left-neighbor pairing from data row 1, 715, is placed one strip to the left of the left-neighbor and into parity row 1, 725. The third equation shows that the lower-left/upper-right neighbor pairing between data row 0, 710, and data row 1, 715, is placed into parity row 2, 730, on the strip that is two strips to the right of the upper-right neighbor. The fourth equation shows that the upper-left/lower-right neighbor pairing between data row 0, 710, and data row 1, 715, is placed into parity row 3, 735, two strips to the right of the lower-right data element of the pair. It should be understood that subscripts for data elements are taken modulo 2N and for parity elements modulo 4N.

It can be seen that the data rows and the parity rows are similar to the embodiment of FIG. 6, with the exception that parity row 2, 730, is rotated to the right one strip with respect to parity row 2, 630, with wrap-around from right to left. Parity row 3, 735, comprises a reverse diagonal pairing interleaving data row 0, 710, and data row 1, 715.

The embodiment of FIG. 7 is exemplary of other embodiments with the same parameters. This data/parity element layout and parity construction requires N≧8.

Yet further embodiments of system 10 are possible. System 10 with parameters N, T, R, Q requires that N be sufficiently large and that:

$$RT = QK \quad (4)$$

By fixing T (the fault-tolerance level) and K (the parity in-degree), equation (4) constrains on the possible choices of the number of data rows R and the number of parity rows Q. For example, if K=2 then either R or T must be even. The embodiments represented in FIG. 4 have T=K and R=Q=1. The embodiments represented in FIG. 5 are cases where R and T are divisible by K. The embodiments in FIG. 6 and FIG. 7 are cases where K=2 and R=2, such that T=3 (FIG. 6) and T=4 (FIG. 7) are possible. More generally, let M be the greatest common divisor of both T and K. Then the smallest configuration (in row numbers) possible has:

$$R = K/M \text{ and } Q = T/M \text{ where } M = \gcd(T, K)$$

These equations hold for the exemplary embodiments of FIG. 4, FIG. 5, and FIG. 6.

The constrained parity in-degree K and the rotational patterns allow for simple implementations of system 10, even for highly fault-tolerant systems. System 10 supports all array sizes N above some limit depending on the specific embodiment. This, together with the constrained parity in-degree, provides for bounded, independent of N, write-lock regions when updating a single or multiple logically contiguous set of data elements. Further, these features also provide for a bounded, independent of N, rebuild zone, the set of elements that are needed from the entire set of elements in a stripe to reconstruct some lost elements. Furthermore, as N increases, system 10 can tolerate certain, but not all, combinations of greater than T faults, thereby providing greater system reliability than other conventional systems.

Figure 8:
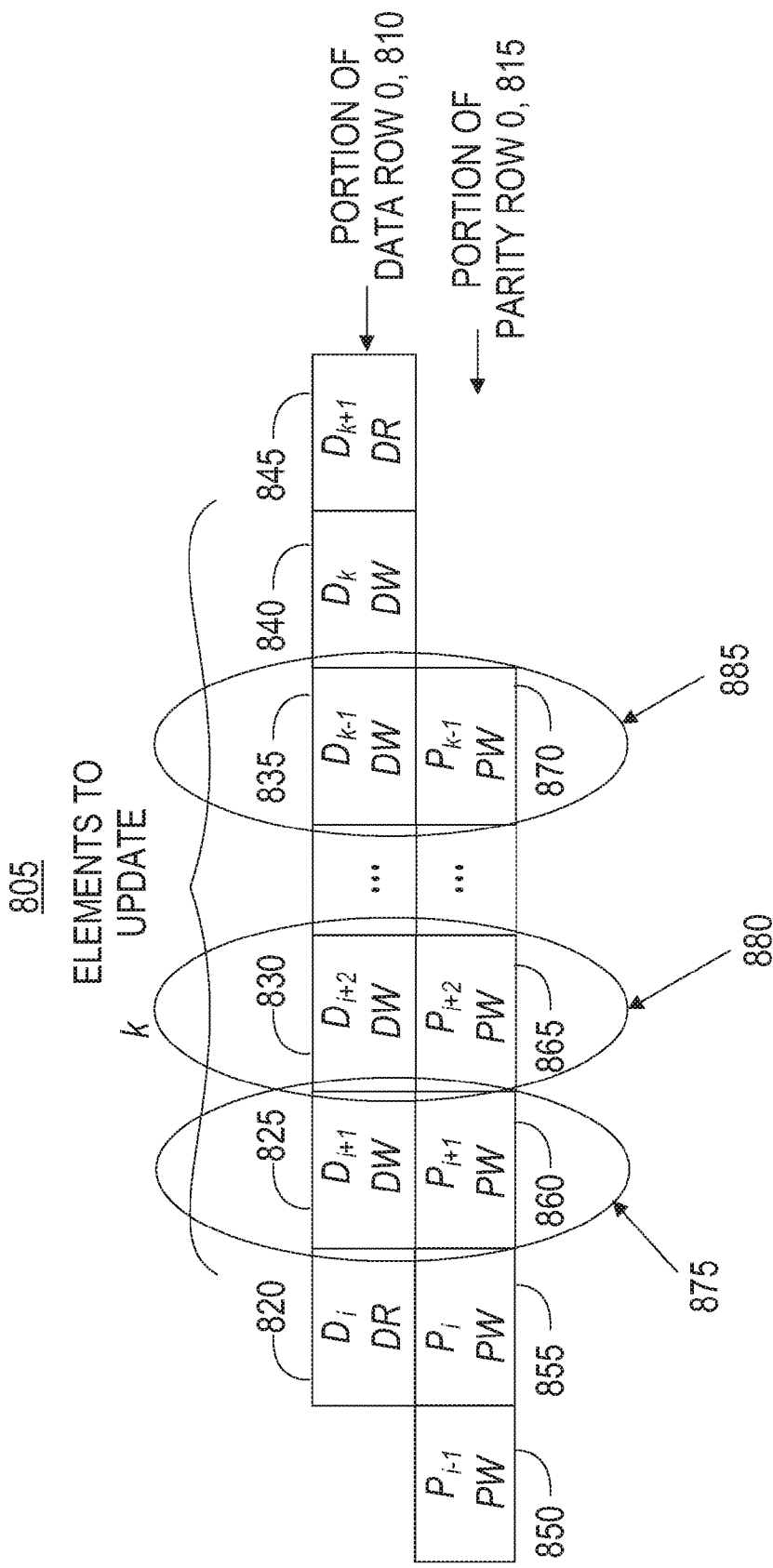
FIG. 8 is a diagram illustrating a pattern of read and write elements for a sequential, multi-element update in one embodiment of the system of FIG. 1.

FIG. 8 illustrates an embodiment of FIG. 4 with T=2, graphically illustrating performance advantages of system 10. A stripe 805 comprises a data row 0, 810, and a parity row 0, 815. A portion of data row 0, 810, and a portion of parity row 0, 815, are shown. The portion of data row 0, 810, comprises data element $D_i$, 820, $D_{i+1}$, 825, and $D_{i+2}$, 830, through $D_{k-1}$, 835, $D_k$, 840, and $D_{k+1}$, 845. The portion of parity row 0, 815, comprises $P_{i-1}$, 850, $P_i$, 855, $P_{i+1}$, 860, and $P_{i+2}$, 865, through $P_k$, 870.

The host system, 15, performs a write to k consecutive data elements $D_{i+1}$, 825, and $D_{i+2}$, 830, through $D_{k-1}$, 835, and $D_k$, 840. In conventional systems, this write process may require reading and writing at least 3 k data and parity elements for a total IO seek cost as large as 6 k. System 10 can implement this update by reading only two data elements $D_i$, 820, and $D_{k+1}$, 845 (indicated by the symbol DR for data read). System 10 computes new parity values that also need updating, then writes out the new data values to data elements $D_{i+1}$, 825, and $D_{i+2}$, 830, through $D_{k-1}$, 835, and $D_k$, 840 (indicated by the symbol DW for data write) and the parity elements $P_{i-1}$, 850, $P_i$, 855, $P_{i+1}$, 860, and $P_{i+2}$, 865, through $P_k$, 870 (indicated by the symbol PW for parity write).

In addition, the update of some pairs of data and parity elements can be performed in one IO seek. In FIG. 8, data element $D_{i+1}$, 825, and parity element $P_{i+1}$, 860, collectively referenced as strip 875, can be updated with one IO seek. Similarly, strip 880 comprising data element $D_{i+2}$, 830, and parity element $P_{i+2}$, 865, through strip 885 comprising data element $D_{k-1}$, 835, and parity element $P_k$, 870, can each be updated with one IO seek. The update to data element $D_k$, 840 and parity elements $P_{i-1}$, 850, $P_i$, 855, can each be performed with one IO as is in conventional systems. Consequently, this write operation of system 10 can be achieved with 3 k IO seeks, improving on the costs of conventional systems. It should be clear to one skilled in the art that other embodiments of system 10 have similar cost advantages when updating logically consecutive data elements.

It is to be understood that the specific embodiments of the invention that have been described are merely illustrative of certain applications of the principle of the present invention. Numerous modifications may be made to the system and method for tolerating multiple storage device failures in a storage system with constrained parity in-degree described herein without departing from the spirit and scope of the present invention. Moreover, while the present invention is described for illustration purpose only in relation to fault-tolerant disk array system, it should be clear that the invention is applicable as well, for example, to any system in which the data and parity element layout is given in FIG. 2 and in which the constraints hold that data out-degree is greater than or equal to the parity in-degree. Such other systems may have disk drives replaced by some other storage device or medium. Though the description herein is exemplified using the disk array, it should be clear to one skilled in the art that the invention can be extended to a network node application or other systems built from storage devices other than disks.

What is claimed is:

1. A method of protecting against T storage device failures in a collection of N storage devices, wherein T and N are positive integers and 2<=T<N the method comprising:
    setting an integer number K between 2 and T inclusive;
    logically partitioning a portion of each of the N storage devices into at least one strip on each of the N storage devices;
    partitioning the at least one strip on each of the N storage devices into at least one data element and at least one parity element;
    organizing the strips of the partitioned portions on the N storage devices into a corresponding stripe wherein each of the N storage devices stores data elements and parity elements in the organized strips of the corresponding stripe;
    for each of the stored parity elements, selecting a set of K data elements from the corresponding stripe so that:
        (a) the selected set of K data elements has not already been selected for another parity element;
        (b) the selected K data elements are located on K different storage devices;
        (c) the K storage devices of the selected K data elements are different from the storage device of the corresponding parity element;
        (d) each data element of the selected K data elements is selected for T different parity elements; and
    generating a parity value from data values stored in the K data elements in the selected set of K data elements and storing the parity value in the stored parity element.

2. The method of claim 1, wherein each data element and each parity element have the same size.

3. The method of claim 1, wherein the N storage devices comprise disks in an array of disks.

4. The method of claim 1, wherein the N storage devices are storage nodes in a network of storage devices.

5. The method of claim 1, wherein all the organized strips have the same number of data elements.

6. The method of claim 1, wherein all the organized strips have the same number of parity elements.

7. The method of claim 1, wherein a ratio of a number of data elements to a total number of data elements and a number of parity elements is at most K/(T+K).

8. The method of claim 1, further comprising assigning the K data elements to sets of data elements for each parity element in a cyclic pattern.

9. The method of claim 1, further comprising computing parity values by exclusive ORing data blocks in the K data elements of the selected set of data elements.

10. The method of claim 1, wherein the stripe is characterized by positive integer parameters N, T, R, and Q wherein:

$$RT=QK,$$

and where: Q represents the number of parity elements in each organized strip, and R represents the number of data elements in each organized strip.

11. The method of claim 10, wherein R and Q have minimal values defined by the following equation:

$$R=K/M \text{ and } Q=T/M$$

wherein M has a value as defined by the following equation:

$$M=\gcd(T, K),$$

where gcd represents a greatest common divisor.

12. The method of claim 1, wherein a pattern for one data element is derived by a rotation of the pattern for any other data element.

13. The method of claim 1, wherein a pattern for one parity element is derived by a rotation of the pattern for any other parity element.

14. The method of claim 1, wherein selecting the set of K data elements from the stripe comprises pairing a data element with the data element at a same logical position with a neighboring strip.

15. The method of claim 1, wherein selecting the set of K data elements from the stripe comprises pairing a data element with one data element at a different logical position within a neighboring strip.

16. The method of claim 1, wherein each organized strip comprises exactly one data element and exactly one parity element and wherein K=T and wherein for an integer k>=K, for each parity element, selecting the set of K data elements comprises selecting K data elements from a set of k strips moving to the right with wrap-around from right to left and starting at an integer offset S from the parity element strip.

17. The method of claim 1, wherein each organized strip comprises exactly one data element and an integer number Q of parity elements and wherein for each integer L with 0<=L= (Q−1), for an Lth parity element in the organized strip, selecting the set of K data elements comprises selecting K data elements from each of the first K organized strips from a sequence of every L+1 strip, moving to the right with wrap-around from right to left starting at an integer offset depending on an integer parameter S and the numbers L and K.

* * * * *